DIAL SELECTIVE INTERCOMMUNICATION SYSTEM

Filed Sept. 29, 1965

INVENTOR
C. E. MORSE
BY Howard R Popper
ATTORNEY

June 17, 1969 C. E. MORSE 3,450,845

DIAL SELECTIVE INTERCOMMUNICATION SYSTEM

Filed Sept. 29, 1965 Sheet 2 of 3

3,450,845
DIAL SELECTIVE INTERCOMMUNICATION SYSTEM

Charles E. Morse, Holmdel, N.J., assignor to Bell Telephone Laboratories, Incorporated, New York, N.Y., a corporation of New York Filed Sept. 29, 1965, Ser. No. 491,349
Int. Cl. H04m *1/00*
U.S. Cl. 179—84 8 Claims

ABSTRACT OF THE DISCLOSURE

A dial selective intercom system is disclosed wherein all stations of the system are connected to a common talking path and the system provides the capability for applying a single burst of ringing to a selected station of the system in response to the dialing of its associated dial code by a calling station in the system.

Figures 1, 4:
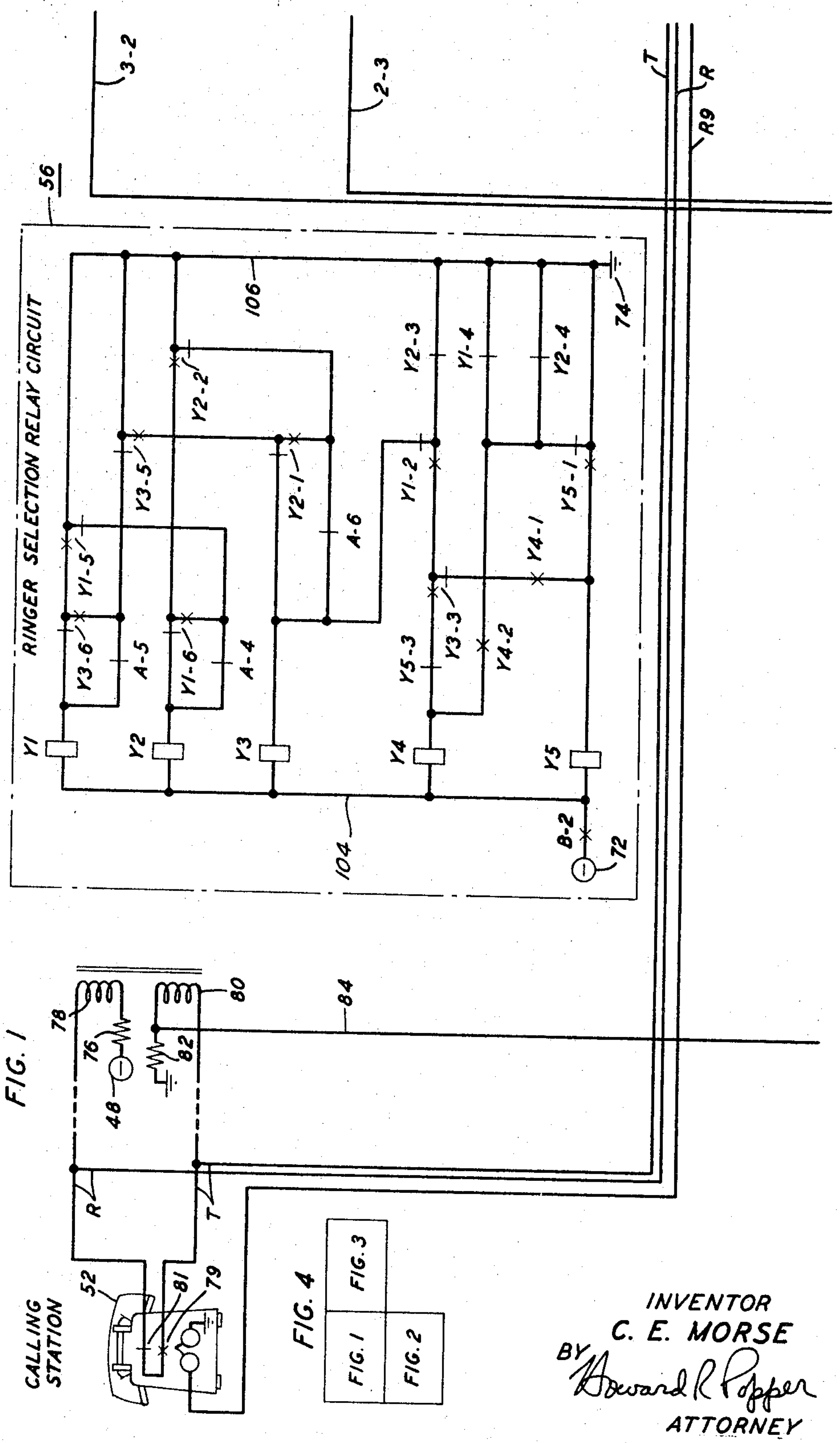

This invention relates to telephone systems and more particularly to intercommunication telephone systems and the like.

An intercom system poses some unusual problems in telephone switching system design. Because there are usually relatively few stations involved it is not economical to provide a fully developed switching network which will assure that a number of different conversations can take place at the same time independently of each other. On the other hand, certain of the selectively characteristics exhibited by fully developed switching network systems are found to be desirable in intercom systems. One of these is the ability to dial a particular station and to ring only that station. It is also desirable to provide relatively simple and inexpensive ringing equipment. In certain applications, however, for example, in a private office where each of the intercom stations is normally attended and consequently where a great deal of ringing would be annoying to co-workers, it is desirable that a single burst of ringing be applied. Since the intercom system should be rapid and automatic in operation, it is undesirable to provide a manual ringing key at the calling station. However, the automatic ringing circuitry employed must be sufficiently economical to be attractive for use in the relatively low budget intercom application.

Accordingly, it is an object of the present invention to provide an economical dial selection intercom system which automatically provides a single burst of ringing to the called station.

In accordance with an illustrative embodiment of the present invention, eight relays and four transistors are employed to provide a ten-station dial selection, automatic ringing intercom telephone system. All of the telephones are provided with common talking battery indepentently of the switching network. The switching network is controlled by dial pulses to select and to connect a single burst of ringing current to the ringer of the called station, the path to the ringer being independent of the talking path. Of the eight relays provided, five are employed for operating the ringer selection network. The remaining three relays are employed respectively to follow the off- and on-hook states of the calling station, to indicate when an off-hook station is in the dialing or ready-to-dial state, and to apply and to disconnect ringing. The latter two relays are controlled by respective timing circuits; one timing circuit maintains its respective relay operated during the open-circuit conditions of the dial pulsing and the other timing circuit allows its respective relay to be operated after a short delay interval subsequent to the completion of dialing. The lastmentioned relay, when operated, connects the ringing signal generator to the ringer selection network and also changes the operating path for the first timing circuit so that instead of maintaining its associated relay operated, it releases its associated relay a predetermined delay interval after the application of the single burst of ringing current. According to one aspect of the foregoing circuit, the second timing circuit uses a path including a portion of the ringer selection network to prevent the connection of the ringing signal generator circuit to the ringer of any line during the continuance of dial pulsing.

Accordingly, it is a feature of the present invention to provide a dial selection intercom system wherein the application of ringing to a called station is timed by a circuit which utilizes a portion of the network that selects the ringer of the called station.

It is another feature of the present invention that the application of ringing signal to a called line is timed for termination by utilizing the timing circuit that normally indicates a calling line to be in the dialing condition.

Figure 2:
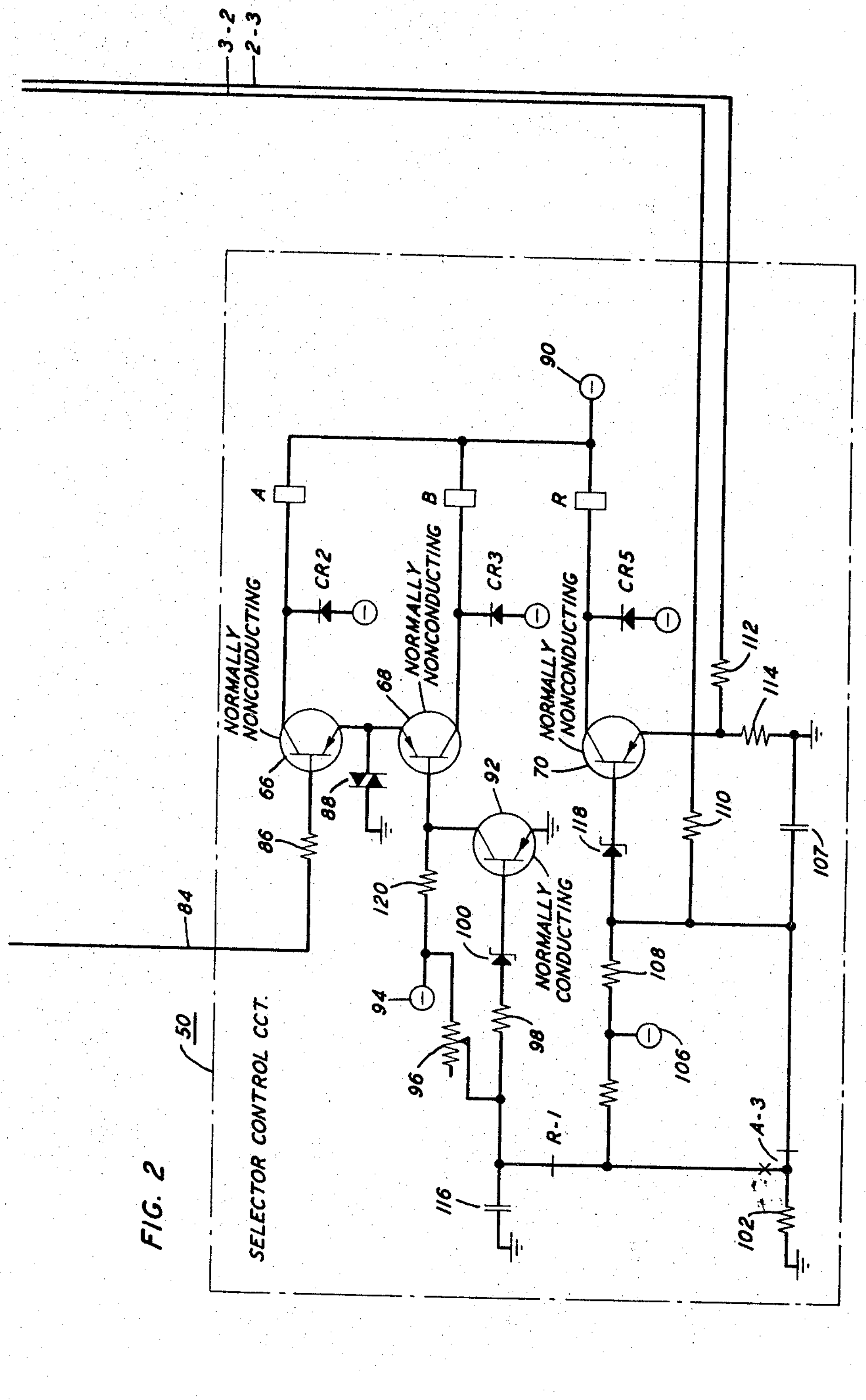
Figure 3:
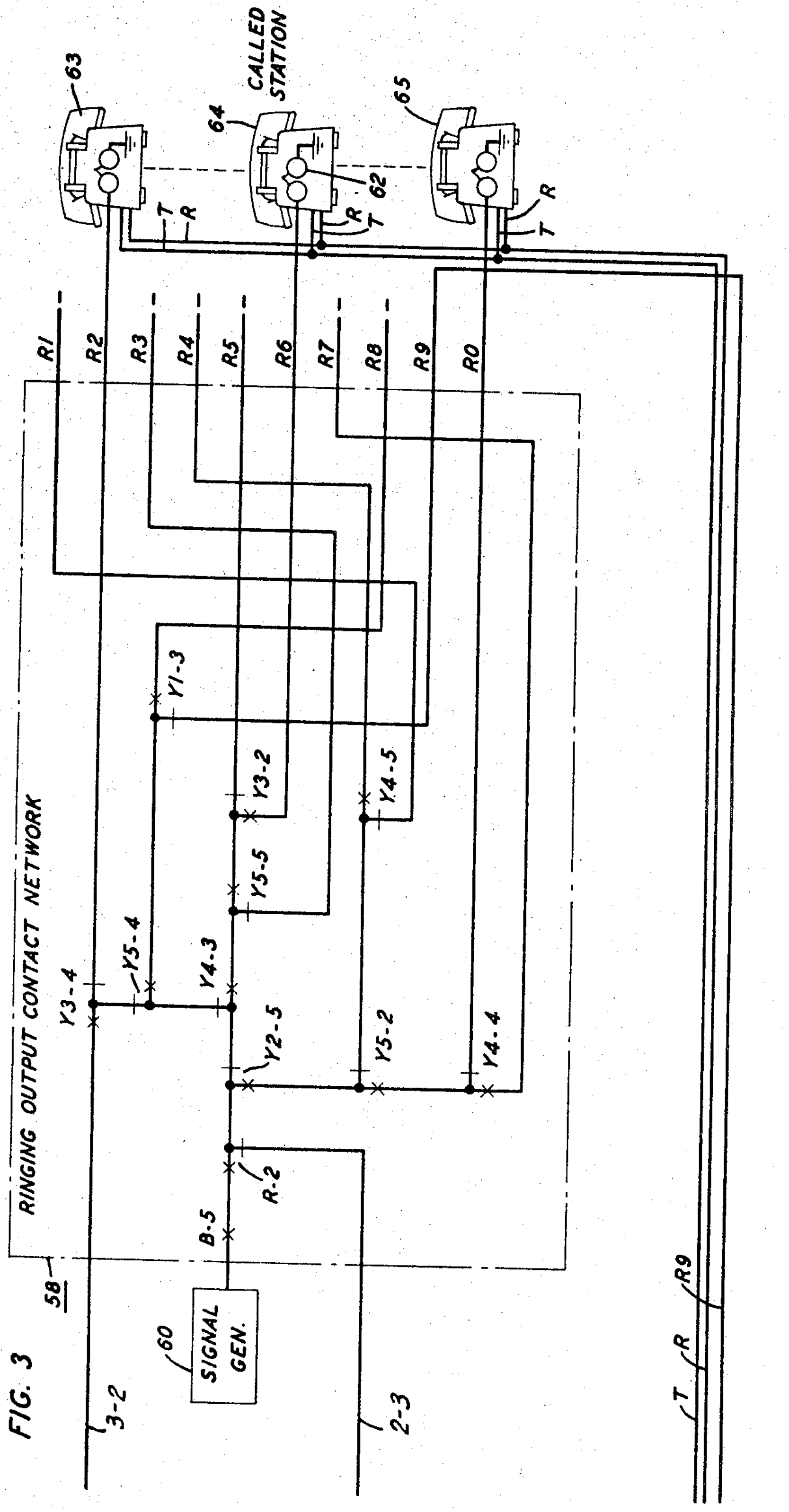

The aforementioned and other objects and features of the invention will be apparent from the following detailed description of a specific embodiment thereof, when read in conjunction with the accompanying drawing, in which:

FIGS. 1 through 3 are a schematic diagram of a circuit for an intercommunication system according to an exemplary embodiment of my invention; and FIG. 4 is a guide showing the correct arrangement of FIGS. 1 through 3.

GENERAL DESCRIPTION

Referring now to the drawing, one of the telephone stations of the intercom system, station 52, has been shown in FIG. 1 and the remaining stations have been shown in FIG. 3 so that an illustrative sequence of operations may conveniently be described, assuming that station 52 is a calling station. In this manner, a left to right sequence of events may be followed in the drawing. All of the intercom stations receive talking battery and ground over the tip and ring lead multiple through the windings of isolating coils 78 and 80 in FIG. 1. Assuming station 52 to be a calling station, its off-hook condition is first detected in the selector control circuit 50 in FIG. 2. Selector control circuit 50 thereupon connects battery to the ringer selection relay circuit 56 in FIG. 1 to prepare the relays therein to be controlled in accordance with dial pulses to be transmitted by station 52. In addition, one of the relays of circuit 56 completes a path in ringing output contact network 58 (FIG. 3) to disable one of the timing elements (70, 107) in selector control circuit 50. When station 52 commences to dial, selector control circuit 50 responds to dialing to selectively operate one or more of relays Y1 through Y5 in the ringer selection relay circuit 56. During the continuance of dialing and at the conclusion thereof, the patterns of operations of the contacts of relays Y1 through Y5 in the ringing output contact network 58 are such as to no longer inhibit the aforementioned timing element in selector control circuit 50. Selector control circuit 50 detects the end of dialing and connects signal generator 60 (FIG. 3) to the ringing output contact network 58. At this time the contacts of the operated ones of relays Y1 through Y5 establish a path in ringing output contact network 58 from signal generator 60 to the ringer of the called one of the other intercom stations shown in FIG. 3. Timing of the ringing is accomplished by re-employing another of the timing elements of circuit 50 which was priorly used to maintain the circuit energized during the on-hook status of dial pulsing by the calling station.

DETAILED DESCRIPTION

When one of the intercommunicating stations, such as station 52 (FIG. 1), is taken off hook, its switchhook make contacts 79 are operated to complete a circuit from battery 48 to ground. Loop current through resistor 82 produces a potential on lead 84 to indicate the service request condition.

The service request potential on lead 84 applies an operating bias through resistor 86 (FIG. 2) to the base electrode of normally nonconducting transistor 66. Activated transistor 66 completes a circuit from ground through varistor 88, emitter and collector electrodes of transistor 66, and winding of relay A to power supply 90.

Energized relay A operates transfer make contacts A–3 in selector control circuit 50 to deactivate normally operating transistor 92 by shunting its base current supply. Prior to the operation of relay A, base current for transistor 92 had been provided through a circuit from power supply 94, variable resistor 96, fixed resistor 98, and Zener diode 100. When relay A operates, its transfer make contacts A–3, break contacts R–1, and resistor 102 provide a ground shunt. The resistance ground back-biases Zener diode 100 which cuts off the base current for transistor 92 and turns off the transistor.

Prior to the operation of relay A, capacitor 116 was charged from battery 94 through resistor 96. When relay A operates, capacitor 116 discharges to ground using the same path as that which shunts the base current of transistor 92. The collector of deactivated transistor 92, which is connected to the base circuit of normally nonconducting transistor 68, approaches the potential of battery 94 and turns on transistor 68. Activated transistor 68 energizes relay B through a circuit from ground through varistor 88, the emitter and collector electrodes of transistor 68, and the winding of relay B to power supply 90.

Energized relay B, at its make contacts B–2 in ringer selection relay circuit 56 (FIG. 1), applies power from source 72 through bus 104 to the windings of selector relays Y1 through Y5. During service request, however, only relay Y3 operates. Its operating path may be traced from power supply 72, operated make contacts B–2, winding of relay Y3, transfer break Y1–2, and break contacts Y2–3 to ground 74 on bus 106. Make contacts B–5 (FIG. 3) in ringing output contact network 58 also are operated to prepare part of the path from signal generator 60 to the ringer of one of the called stations.

Accordingly, with station 52 off hook, and prior to dialing, relays A, B, and Y3 are operated, transistors 66 and 68 are conducting, and transistor 92 is nonconducting. Prior to station 52 going off hook, transistor 70 had been held nonconducting by back contact A–3 providing a resistance ground shunt to its base. While station 52 is off hook, and prior to dialing, transistor 70 is maintained nonconducting by the operation of transfer make contacts Y3–4 in FIG. 3. This transfer make contact connects together resistor 110 and 112 in the base and emitter circuits of transistor 70 via leads 3–2 and 2–3. This path may be traced from ground (FIG. 2), resistor 114, resistor 112, lead 2–3, back contact R–2 (FIG. 3), back contacts Y2–5, Y4–3 and Y5–4 and make contact Y3–4 to lead 3–2 and resistor 110 (FIG. 2). Connecting resistors 110 and 112 together maintains the junction of resistor 108 and Zener diode 118 to keep diode 118 back-biased. In this condition there is insufficient base current available for transistor 70 to conduct. Transistor 70 in the nonconducting condition prevents relay R from operating. Once dialing commences, as will hereinafter be described, it will be seen that regardless of the pattern in which relays Y1 through Y5 are operated, the path between resistor 110 and 112 is opened and maintained opened.

If transfer make contact R–2 in the ringing output contact network 58 is operated before dial pulsing, each dial pulse when subsequently received would establish in turn a completed ringing signal path to a respective intercom ringer. This undesirable situation would cause a short burst of ringing signal to be sent over these paths to each of the intercom stations as the paths are set up in sequence between the signal generator 60 and the stations. Because the time between taking station 52 off hook and initiating dial pulsing is entirely under the control of the calling party, this improper ringing situation is prevented by the priorly described shunt path through resistors 110 and 112. These resistors keep transistor 70 and relay R inactive until the first dial pulse is registered in selector control 50. The first dial pulse, and all of the succeeding dial pulses, keep the circuit between resistors 110 and 112 open through the selective operation of relays Y1 through Y5.

Relay R is kept inactive during subsequent dial pulsing through two circuits that shunt the base of transistor 70. Thus the parellel combination of resistor 102 and capacitor 107 in series with resistor 108 (when relay A is not operated) holds the potential applied to Zener diode 118 below breakdown value. The series combination of capacitor 107 and resistor 108 (when relay A is operated) has a time constant that keeps the voltage applied to diode 118 below breakdown until relay A is once more de-energized. The time between dial pulses is a known mechanical characteristic of the dial. Consequently, a time constant for capacitor 107 and resistor 108 that will keep the voltage below breakdown for Zener diode 118 during a normal dial pulse interval can be selected so that transistor 70 will be kept nonconducting during these known inter-dial pulse intervals but which time constant will permit transistor 70 to turn on when the interval is exceeded at the conclusion of dialing.

SELECTOR CONTROL CIRCUIT—DIAL PULSING

When the intercom user at station 52 commences to dial, conventional dial break contacts 81 are operated to break circuit continuity between leads T and R. The negative potential on lead 84 is interrupted in response to each dial pulse, turning transistor 66 off and on and causing relay A to release and reoperate. Each time relay A releases and reoperates, contacts A–4, A–5, and A–6 associated with the A relay in ringer selection relay circuit 56 establish a pattern of connections between power supply 72 and ground 74 to selectively energize and de-energize relays Y1 through Y5. Energizing these relays, either individually or in combinations, establishes distinct signal paths through ringing output contact network 58 between signal generator 60 and individual stations among the intercommunicating stations 63 to 65 in accordance with the number of dial pulses transmitted by calling station 52.

It will be recalled that relay B was energized by operating transfer make contacts A–3 to provide a temporary shunt that discharged capacitor 116 and deactivated transistor 92. When relay A is de-energized in response to the dial pulses, discharged capacitor 116 prevents transistor 92 from turning on and de-energizing relay B. Transistor 92 is held nonconductive between successive dial pulses by capacitor 116 which, in recharging, provides a temporary shunt that maintains the back-bias on Zener diode 100. Consequently, as hereinbefore described, transistor 68, the base of which is connected to the collector electrode of transistor 92, remains on and keeps relay B energized. Operated relay contacts B–2 (FIG. 1) continue to provide power for the windings of selector relays Y1–Y5. During dialing, each time relay A is released, its back contacts A–3 in FIG. 2 reapply resistance ground to maintain Zener diode 118 back-biased. In this manner transistor 70 is prevented from conducting even though the path between resistors 110 and 112 is open-circuited by the pattern of relay contact operation in ringing output contact network 58. Even though the A relay is reoperated between dial pulses, resistor 108 provides a time delay which prevents capacitor 107 from charging sufficiently to turn on transistor 70.

At the end of dial pulsing, relay A is reoperated. Its break contacts A–3 no longer prevent capacitor 107 from charging and after an interval which is greater than the time required for the transmission of another dial pulse, transistor 70 turns on. When transistor 70 turns on, relay R is energized and operates transfer contacts R–2 in output contact network 58 (FIG. 3) to complete the path for the ringing signal from generator 60 to the ringer 62 of called station 64.

Operation of break contact R–1 (FIG. 2) disconnects the base current shunt for transistor 92 that was provided by resistor 102 and operated transfer make contacts A–3. When resistor 102 is disconnected, capacitor 116 and variable resistor 96, which during dialing served to time the inter-dial pulse intervals to prevent relay B from releasing, now serve to time the ringing interval and to release relay B for this purpose. More particularly, when contacts R–1 are opened, capacitor 116 commences to charge from power supply 94 through variable resistor 96. While capacitor 116 continues to charge, Zener diode 100 remains back-biased and keeps transistor 92 inactive. When capacitor 116 charges fully, Zener diode 100 breaks down and transistor 92 conducts to complete a circuit from ground through the emitter and collector electrodes of transistor 92 and resistor 120 in the base of transistor 68 to power source 94. This effectively grounds the base of transistor 68 and causes transistor 68 to turn off.

Deactivated transistor 68 releases relay B. When relay B is released, make contacts B–5 in ringing output contact network 58 are restored and disconnect signal generator 60 from relay output contact network 58. The ringing signal is thereby retired at the end of an interval established by the charging time for the combination of variable resistor 96 and capacitor 116. Make contacts B–2 in ringer selection relay circuit 56 also are restored and de-energize ringer selection relay circuit 56. Releasing the relays in circuit 56 causes the contacts in relay output contact network 58 to release and automatically return all circuits of FIGS. 1–3 (except the talking stations) to an idle condition. In this idle condition, neither the selector control circuit 50, the ringer selection relay circuit 56, nor the ringing output contact network 58 play an active part in the connection between the parties.

SELECTOR RELAY CIRCUIT—OPERATION

The operation of ringer selection relay circuit 56 (FIG. 1) will now be described in connection with the operation of the A relay of FIG. 2; that is, the pattern in which break contacts A–4, A–5, and A–6 are operated and released.

During service request, power supply 72 is connected through make contacts B–2 to the bus 104 and then to the windings of all of the selector relays, and A relay break contacts A–4, A–5, and A–6 are operated. In this condition, it will be recalled, only selector relay Y3 is energized through a path from power supply 72 to ground on bus 106.

To provide a specific illustration of the operation of the selector relays and the associated control contact network, assume that called station 64 is identified by six dial pulses. During the first dial pulse, the A relay is de-energized and the relay Y3 stays operated. Break contacts A–4 are restored to provide an operating path for the winding of relay Y2 through break contacts A–4 and transfer break contacts Y1–5 to ground. Energized relay Y2 operates transfer break contacts Y2–2 to establish an additional operating path from Y2 relay winding to ground through transfer break contacts Y1–6. When relay Y2 operates, relay Y3 is maintained operated over break contacts A–6 and transfer make contacts Y2–1 and Y3–5. Operated transfer break contacts Y3–5 prevent relay Y1 from operating.

At the end of the first dial pulse, relay A is once again energized to operate break contacts A–6 and release relay Y3. Relay Y2 remains energized.

The second dial pulse releases break contacts A–5 to establish a path from the winding of relay Y1 to ground through break contacts A–5 and released transfer break contacts Y3–5. Energized relay Y1 operates transfer make contacts Y1–5 to establish a second path from relay Y1 to ground through transfer break contacts Y3–6. Relay Y1 also operates transfer break contacts Y1–6 to cause relay Y2 to release.

Re-energization of relay A at the end of the second dial pulse operates break contacts A–5 in the operating path of relay Y1. Relay Y1 remains operated over released transfer back contacts Y3–6 and transfer make contacts Y1–5. The specific detailed operation of the relay control contact network and the selector relays in response to additional dial pulses is shown in the following table:

| Number of dial pulses | Number of A relay change of state | A relay | | Relay operation | | | | |
|---|---|---|---|---|---|---|---|---|
| | | Released | Operated | Y1 | Y2 | Y3 | Y4 | Y5 |
| Service request | 0 | | x | 0 | 0 | 1 | 0 | 0 |
| | 1 | x | | 0 | 1 | 1 | 0 | 0 |
| 1 | 2 | | x | 0 | 1 | 0 | 0 | 0 |
| | 3 | x | | 1 | 1 | 0 | 0 | 0 |
| 2 | 4 | | x | 1 | 0 | 0 | 0 | 0 |
| | 5 | x | | 1 | 0 | 1 | 1 | 0 |
| 3 | 6 | | x | 0 | 0 | 1 | 1 | 0 |
| | 7 | x | | 0 | 1 | 1 | 1 | 0 |
| 4 | 8 | | x | 0 | 1 | 0 | 1 | 0 |
| | 9 | x | | 1 | 1 | 0 | 1 | 0 |
| 5 | 10 | | x | 1 | 0 | 0 | 1 | 1 |
| | 11 | x | | 1 | 0 | 1 | 1 | 1 |
| 6 | 12 | | x | 0 | 0 | 1 | 1 | 1 |
| | 13 | x | | 0 | 1 | 1 | 1 | 1 |
| 7 | 14 | | x | 0 | 1 | 0 | 1 | 1 |
| | 15 | x | | 1 | 1 | 0 | 0 | 1 |
| 8 | 16 | | x | 1 | 0 | 0 | 0 | 1 |
| | 17 | x | | 1 | 0 | 1 | 0 | 1 |
| 9 | 18 | | x | 0 | 0 | 1 | 0 | 1 |
| | 19 | x | | 0 | 1 | 1 | 0 | 1 |
| 10 | 20 | | x | 0 | 1 | 0 | 0 | 1 |

Thus for a dialed input of six pulses, twelve A relay changes of state are produced. These twelve changes of state ultimately energize relays Y3, Y4, and Y5 through appropriate connections in ringer selection relay circuit 56. Other contacts on operated relays Y3, Y4, and Y5 appearing in ringing output contact network 58 establish part of a unique path for the ringing signal from signal generator 60 to ringer 62 of called station 64, as subsequently described.

OUTPUT CONTACT NETWORK

To establish part of a path through ringing output contact network 58 (FIG. 3) for the transmission of ringing signal from generator 60 to called station 64, it will be recalled that make contacts B–5 and make transfer contacts R–2 were operated. Another portion of the signal path through network 58, established by the specific status of the selector relays unique to a six-dial pulse input, includes transfer break contacts Y2–5 and operated transfer make contacts Y4–3, Y5–5, and Y3–2.

It will be recalled that shunting resistances 110, 112, and 114 (FIG. 2) must be disconnected from the base of transistor 70 to enable relay R to indicate the end of dial pulsing and operate transfer make contacts R–2 to complete the ringing signal path. The operation of the contact circuit in output network 58, comprised of transfer make contacts Y3–4 and transfer break contacts Y5–4, Y4–3, Y2–5, and R–2, ensures that these shunting resistances will be disconnected from the base of transistor 70 during and at the end of dial pulsing. An examination of the above table clearly shows that relay Y3 is released or relays Y2, Y4 or Y5 are operated for each A relay change of state after service request to produce the required break in shunt resistor circuit continuity. This particular characteristic of my circuit enables relay R to energize at the end of dial pulsing and complete the circuit for the ringing signal, as hereinbefore described.

TERMINATING CALL

It will be recalled that relays Y1 through Y5 and relays A, B, and R were restored automatically to an idle status at the end of the ringing signal such that the circuit was not engaged or actively participating in the connection between the calling and the called station. Consequently, an intercommunicating call is terminated when the calling and called parties go back on hook. This restores switchhook make contacts 79 and breaks circuit continuity for battery 48 to free the system for another call.

Thus I have provided an economical dial selectable intercommunication system in which the selector circuit automatically provides a timed single burst of ringing and which restores itself to an idle condition at the end of a predetermined ringing interval.

It is to be understood that the above-described arrangements are merely illustrative of the principles of this invention and various other arrangements may be devised by those skilled in the art without departing from the spirit and scope of the invention.

What is claimed is:

1. An intercommunicating telephone system comprising:

a plurality of dial telephone stations each having an individual ringer;

means for following the off- and on-hook states of a calling one of said telephone stations;

means responsive to said following means for preparing a ringing path to the ringer of a called one of said stations;

means including a timing circuit controlled by said following means for maintaining said responsive means enabled during an on-hook state of said calling one of said telephone stations;

means for applying a ringing signal to said prepared ringing path; and means controlled by said ringing signal applying means for energizing said timing means to release said prepared ringing path at the expiration of a predetermined interval during the continued off-hook state of said calling one of said telephone stations.

2. An intercommunicating telephone system according to claim 1 comprising second timing circuit means including a portion of said ringing path preparing means for timing the sequence of dial pulses transmitted by said calling one of said telephone stations, and for detecting the end of said sequence, and means controlled by said second timing circuit means for operating said ringing signal applying means.

3. An intercommunicating telephone system according to claim 2 wherein said means responsive to said following means includes a plurality of counting relays and wherein said portion of said ringing path for controlling said second timing circuit means comprises a chain of contacts controlled by said counting relays to open-circuit said portion of said ringing path throughout the duration of said sequence of dial pulses.

4. An intercommunicating telephone system according to claim 3 wherein each of said timing circuit means includes a respective capacitor and wherein said means for following said off- and on-hook states of said calling one of said telephone stations includes a relay for selectively maintaining one of said capacitors discharged during the off-hook states of said calling one of said telephone stations and for maintaining the other of said capacitors discharged during the on-hook states of said calling one of said telephone stations.

5. An intercommunicating telephone system according to claim 4 wherein said means controlled by said ringing signal applying means includes a contact for disconnecting said circuit for maintaining said one of said capacitors discharged during said off-hook state of said calling one of said telephone stations.

6. An intercommunicating telephone system comprising:

a plurality of dial telephone stations each having an individual ringer;

means responsive to dial pulses transmitted by a calling one of said stations for preparing a ringing path to the ringer of a called one of said stations;

capacitor timing circuit means for controlling the application of ringing current to said ring path;

means including a portion of said ringing path for inhibiting said timing circuit means upon the commencement of transmission of said dial pulses; and means controlled by said dial pulse responsive means for maintaining said timing circuit means inhibited during the transmission of said dial pulses.

7. A dial selection intercommunication telephone system comprising a plurality of dial telephones connected to a common talking path, a source of ringing signal, means including a plurality of selection relays and a contact selection network of said selection relays for preparing a ringing path from said source to a selected one of said telephones, a first relay responsive to dial pulses from a calling one of said telephones for energizing said selection relays, a second relay operated on initial energization of said first relay, first timing means for controlling said second relay and preventing release of said second relay on release of said first relay during interpulse intervals of said dial pulses, means for connecting said source to said ringing path, second timing means for controlling said connecting means, means including a portion of said contact network for providing a first control of said second timing means and responsive to said first relay for providing a second control of said second timing means, and means responsive to said connecting means to cause said first timing means to control said second relay to permit only a predetermined interval of ringing signal to be applied to said path.

8. A dial selection intercommunication telephone system in accordance with claim 7 further comprising means responsive to said second relay for restoring said selection relays responsive to operation of said first timing means.

References Cited

UNITED STATES PATENTS

| | | | |
|---|---|---|---|
| 2,496,159 | 1/1950 | Hagens | 179—37 |
| 3,014,097 | 12/1961 | Apt. | |

KATHLEEN H. CLAFFY, *Primary Examiner.*

W. A. HELVESTINE, *Assistant Examiner.*